Félix Floret
Jean-Jacques Mayer
Georges Peronneau
INVENTORS.

BY *Karl G. Ross*
Attorney

Félix Floret
Jean-Jacques Mayer
Georges Peronneau
INVENTORS.

BY Karl G. Ross
Attorney

United States Patent Office 3,559,182
Patented Jan. 26, 1971

3,559,182
SYSTEM FOR TRACING SYMBOLS ON VISUAL
INDICATOR WITH ORTHOGONAL SWEEP
Félix Floret, Ste.-Geneviere-des-Bois, Jean-Jacques Mayer,
Paris, and Georges Peronneau, La Celle-St.-Cloud,
France, assignors to T-V.T. (Thomson-C.S.F. Visualisation et Traitement des Informations), a corporation of France
Filed Dec. 20, 1967, Ser. No. 692,026
Claims priority, application France, Dec. 22, 1966, 88,471
Int. Cl. G06f 3/14
U.S. Cl. 340—172.5
15 Claims

ABSTRACT OF THE DISCLOSURE

A luminous pencil with photoelectric pickup is manually displaced across a screen of a cathode-ray tube, illuminated by an orthogonally swept electron beam, to transmit positional pulses to a ferrite memory where the information is stored for feedback to the input of the same tube whereby the illumination is blacked out at the locations scanned by the pencil and a dark trace appears on the screen. Simultaneous or delayed transmission to other cathode-ray tubes will cause the same trace to become visible on their screens. For complete erasure of a trace, the memory may be temporarily blanked; partial erasure may be effected by retracing a portion of the image and inverting the output of the pickup to produce a selective blanking signal. Use of a multicolor tube permits selective coloring of the trace.

---

Our present invention relates to a system for the tracing of electronically reproducible symbols to facilitate transmission thereof to a visual reproducer at a nearby or remote location.

The general object of this invention is to produce improved means for the tracing and the transmission, over short or long distances, of any curve, character or other symbol of more or less intricate configuration.

A more particular object of our invention is to provide a system utilizing conventional circuitry, e.g., as used in commercial television, for the creation and transmission of such tracings.

It is also an object of this invention to provide means for the immediate electronic production of a lasting visible image of the character or other symbol at the point of tracing, thus enabling the operator to check and, if desired, to correct the shape he has created.

A related object is to provide simple means for completely or partly obliterating a trace at the option of the operator.

A further object of our invention is to provide means for concurrently reproducing the same trace on an unlimited number of receivers.

Another object of this invention is to provide means for enabling a retarded transmission, possibly in coded form, of such traces over channels, such as cables or radio links, whose frequency band may be too narrow to permit their transmission at the original rate of generation.

A still further object of the invention is to provide means for enabling the production and/or transmission of selectively colored tracings and possible change in the color of an existing trace.

With these objects in view, our invention provides for the use of a point source of light, such as the beam of a cathode-ray tube scanning a predetermined area under the control of orthogonal sweep means, in combination with a mobile photoelectric pickup device (hereinafter referred to as "luminous pencil") whose output is stored on a memory composed of a multiplicity of storage elements such as ferrite cores of the miniature type. The storage elements are successively activated under the control of an address circuit responsive to synchronizing signals from the sweep means of the light source whereby an information pulse indicative of the instantaneous position of the pickup device is inscribed upon a selected storage element whenever the light source registers with the input of that device. A reading circuit then samples the storage elements of the memory to reproduce the traced outline directly on the projection screen of the light source and/or on some other receiver or receivers.

In order to enable the operator to monitor his own tracings, in a system in which the screen of a cathode-ray tube is used as the tracing area, we prefer to feed back the readout information pulses to the intensity-control electrode of the tube and to provide a connection from the feedback loop to the writing circuit of the memory for the iterative reinscription of the read-out pulses on the same storage element. A blanking circuit connected to the feedback loop may be used for the complete erasure of a previously registered trace; partial erasure may be carried out with the aid of an alternate output of the luminous pencil which invertedly controls the writing circuit of the memory (advantageously by way of the aforedescribed feedback connection) so as to discontinue the iterative reinscription of certain pulses.

The reading circuit may include a source of relatively slow timing pulses (as compared with the scanning rate of the electronic beam) for retrieving the information stored in the memory at a speed low enough to permit its transmission over a channel of limited bandwidth; at the receiving end of the channel, the information is reinscribed on another memory at the same low speed and can thereafter be read out at high speed for reproduction on a conventional television screen. In order to insure privacy, the transmitted message may be garbled at the point of transmission by a scrambler and may be restored on reception by a complementary unscrambler.

The receiver or receivers supplied by the reading circuit may be in the form of multichromatic tubes as used in color television, each tube being equipped with a plurality of electron guns for the generation of a monochromatic image of a distinct color. A separate memory unit may be used to store color signals associated with successive information pulses, or groups of such pulses, to determine the selection of a specific electron gun (or possibly a combination of such guns) in each associated receiver. If several beam sources are jointly used to register a trace composed of two or more constituent colors, selective blanking of an ancillary memory level will bring about a change in color.

Another aspect of our invention relates to the construction of the memory preferentially used to store the information pulses generated during a scanning frame. If the tracing area is a predetermined portion of the screen of a cathode-ray tube containing a multiplicity of (usually horizontal) scanning lines, generally several hundreds of such lines, it will be convenient to subdivide each line into a plurality of segments, each segment in turn containing a predetermined number $n$ of elemental parts. Whereas in commercial television a resolution on the order of 500 elements per line and 500 lines per frame is generally employed, a coarser degree of resolution is considered satisfactory in most instances of trace registration according to our present invention. Thus, the tracing area may consist of about 250 to 350 lines each subdivided into approximately 250 elemental parts, the number $m$ of segments per line being conveniently on the order of 10. The $n$ elemental parts of each line segment may then be stored simultaneously on corresponding elements (e.g., ferrite cores) of $n$ parallel memory levels, each level comprising a planar array of $q$ rows of $p$ storage elements each. The number $pq$ of available storage elements per level should then be equal to or greater than the product $mk$ where $k$ is the number of active lines within the scanning area; with the numerical values previously given by way of example, an array with $p=q=64$ will be ample.

For the simultaneous inscription and readout of the information pulses on the several memory levels suitable distribution means must be provided in the input and output circuits of the memory. These circuits can be realized in a compact manner by conventional logical circuitry.

The invention will be described in greater detail with reference to the accompanying drawing in which.

Figure 1:
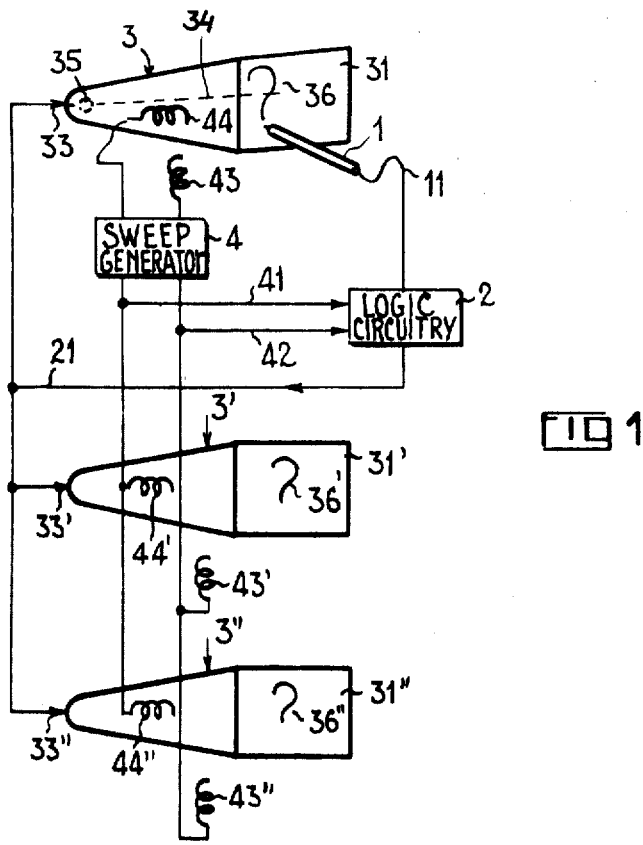
FIG. 1 is a diagrammatic overall view of a tracing system according to our invention.
Figure 2:
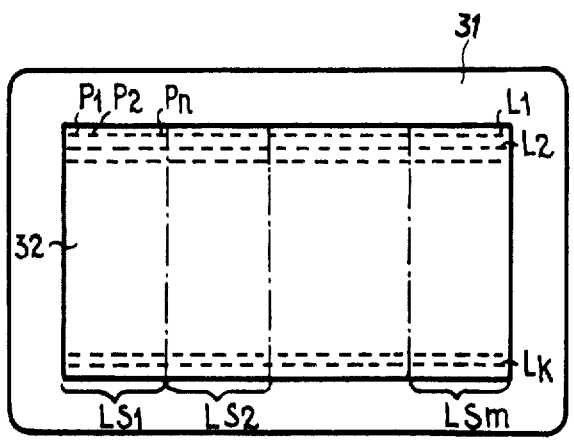
FIG. 2 is a face view of a monitoring or receiving screen forming part of the system of FIG. 1.

In FIG. 1 we have shown a luminous pencil 1 of a type known per se, incorporating a photoelectric cell or equivalent transducer, whose input point may be manually displaced across the screen 31 of a cathode-ray tube 3 so as to register with any elemental part $P_1$, $P_2$, etc., of a predetermined tracing area 32 thereof (FIG. 2). The output of pencil 1 is fed via a lead 11 to a logic network 2 described in detail hereinafter with reference to FIGS. 3–6. Network 2 also receives synchronizing signals by way of leads 41 and 42 from a sweep generator 4 controlling the deflecting elements 43, 44 of tube 3 which have been symbolized here by electromagnetic coils. The output 21 of network 2 is connected to an input terminal 33 of tube 3 which controls the intensity of a beam 34 emitted by an electron gun 35. Circuit 21, 33 constitutes a feedback loop through which electric pulses due to light picked up by the pencil 1 are returned to the beam source with such a polarity as to suppress the beam 34 whereby a visible trace 36 is formed on the screen 31 as a dark line on a bright field. Replicas 36', 36" of trace 36 are concurrently produced on screens 31', 31" of identical cathode-ray tubes 3', 3" whose inputs 33', 33" are connected to lead 21 in parallel with input 33 and whose deflectors 43', 44' and 43", 44" are connected to the output of sweep generator 4 in parallel with coils 43 and 44. The logic network 2 is so arranged that, as described in detail hereinafter, information pulses appearing on lead 11 are stored in a memory and, upon being read out on lead 21, are immediately reinscribed on the same storage elements of the memory as before so that the traces 36, 36', 36" are perpetuated on their respective screens until the operator, in a manner explained below, obliterates all or part of that trace. Naturally, the number of receiving tubes connected in parallel to the outputs of circuits 2 and 4 can be indefinitely increased.

As illustrated in FIG. 2, the tracing area 32 of screen 31 is divided into a multiplicity of scanning lines numbered from $L_1$ through $L_k$. Each line, in turn, consists of an identical number of segments $LS_1$, $LS_2$ . . . $LS_m$, each of these segments encompassing $n$ elemental parts $P_1$ through $P_n$. We shall assume, by way of example, that $n=24$, $m=10$ and $k=270$, the latter value being particularly applicable to a television system operating on 625 lines to the frame; in a system with 819 lines per frame, we may choose $k=350$. Since with 240 points on a line, the spacing of these points would be somewhat greater than the normal line spacing, the vertical scan may be accelerated throughout the area 32 so as to provide substantially equal resolution in both dimensions.

Figure 3:
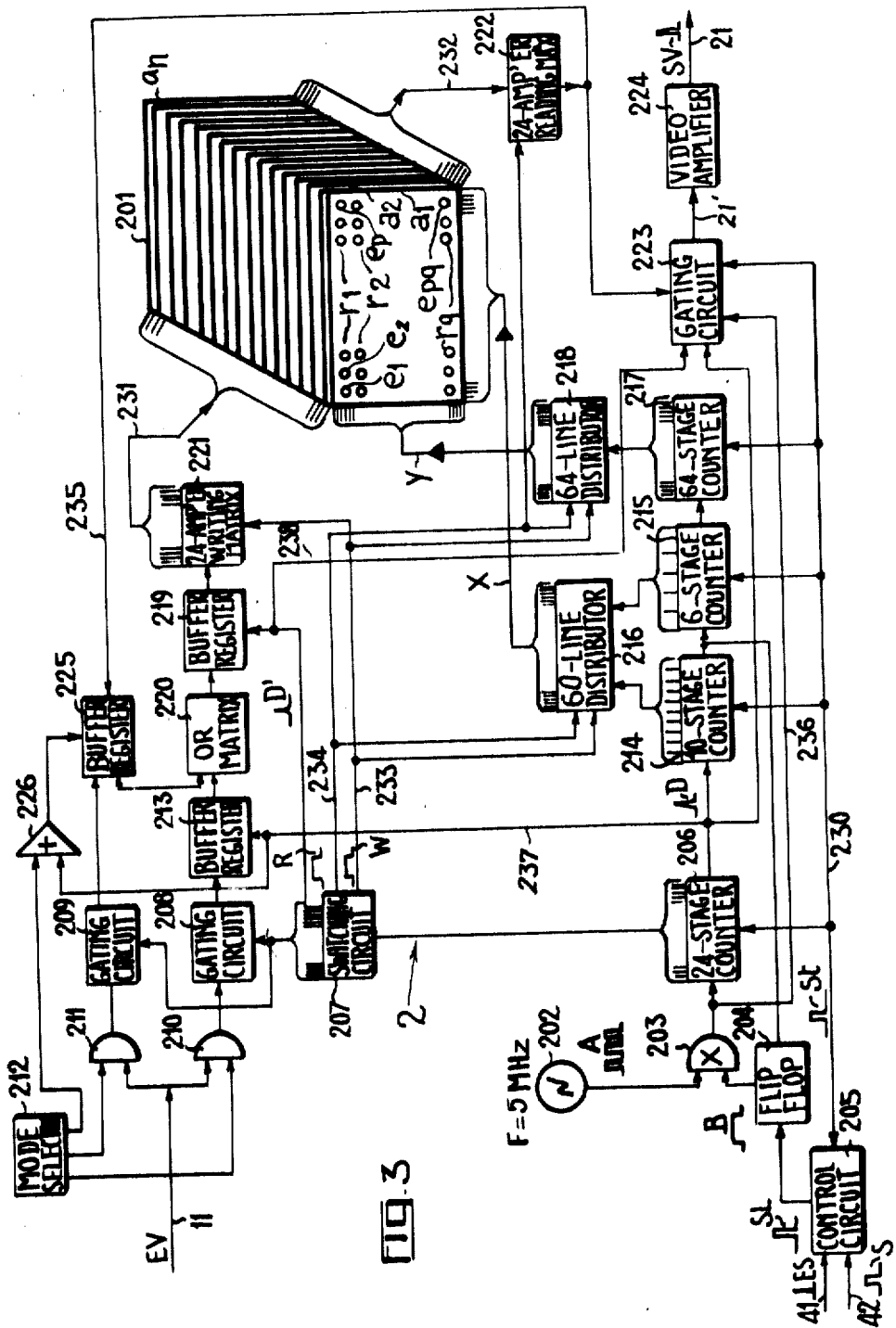
FIG. 3 is a block diagram of the circuits included in the system.
Figure 6:
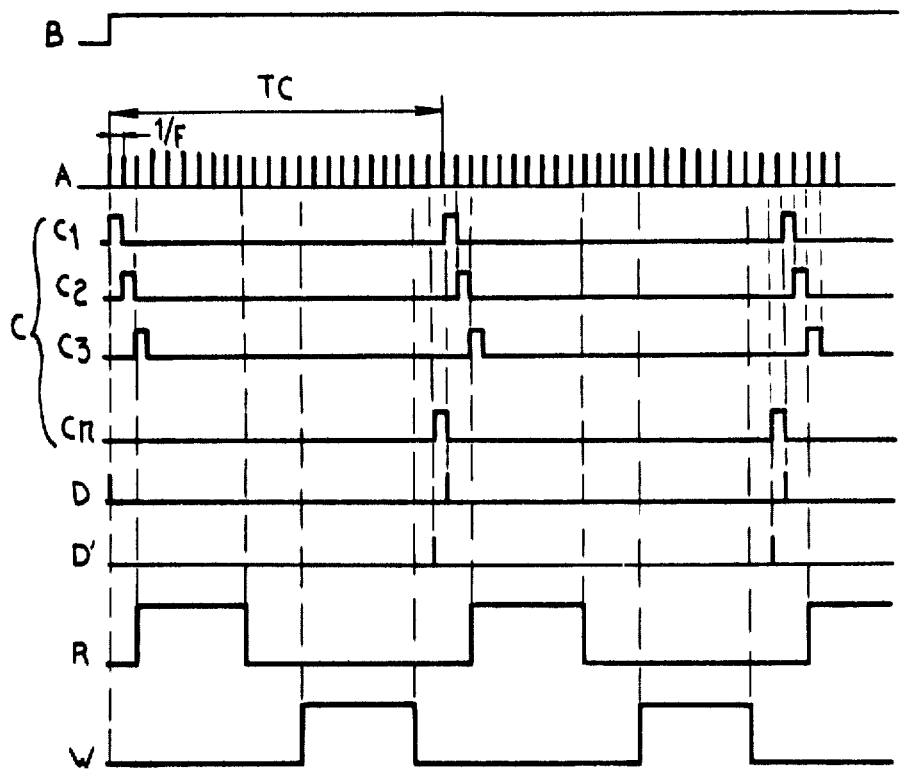
FIG. 6 is a set of graphs serving to explain the operation of the system of FIGS. 1–5.

In FIG. 3 we have shown details of the logic network 2 with its input leads 11, 41 and 42 as well as its output lead 21. Lead 11 extends to an input of each of two AND gates 210, 211 whose other inputs are selectively energizable under the control of a manually operable selector switch 212. Leads 41 and 42 terminate at a control circuit 205 which delivers a line-start SL to a flip-flop 204 in response to a synchronizing signal ES on lead 41 and which generates an end-of-frame signal ST on a lead 230 in response to a synchronizing pulse S on lead 42. If desired, pulse SL may be delayed with reference to the line-flyback pulse ES in order to provide a certain margin between the tracing area 32 and the left-hand edge of screen 31 (FIG. 2). Flip-flop 204, when set by a pulse SL, applies an energizing voltage B to one input of an AND gate 203 whose other input received a continuous train of timing pulses A from an oscillator 202 operating at a cadence $F=5$ mHz. corresponding to a basic timing interval $1/F=0.2$. $\mu s$. In the presence of "on" signal B, the pulses A are passed to a 24-stage counter 206 and, in parallel therewith, to a distribution matrix 223 having the same number of stages. An operating period of counter 206, corresponding to 4.8 $\mu s$, will be referred to hereinafter as a memory cycle TC (FIG. 6). At the beginning of each new memory cycle, counter 206 generates a switching pulse D which steps a 10-stage counter 214 and is also applied to a receiving terminal of a buffer register 213. A further pulse counter 215 is stepped by counter 214 at every tenth pulse D, the output of counter 214 being also applied to a reset input of flip-flop 204 so that the "on" signal B is terminated at the end of ten consecutive memory cycles corresponding to a horizontal scan of the area 32 in FIG. 2. Counter 215 has six stages and, when returning to zero at the end of 60 memory cycles TC, steps a final counter 217 of 64 stages. The pulse ST on lead 230 is applied to zeroizing inputs of all four counters 206, 214, 215, 217, as well as gating circuit 223, at the end of each scanning frame.

The 24-stage outputs of counter 206 extend to a switching circuit 207 which converts them into 24 interleaved trains of code pulses C and which also derives therefrom, once per cycle TC, a reading pulse R and a writing pulse W as well as another switching pulse D' slightly preceding the pulse D from counter 206. The rectangular code pulses C, of 0.2 $\mu s$. duration, are fed to a pair of gating circuits 208 and 209 in parallel, only one of these gate circuits being effective according to the position of mode selector 212 controlling the AND gates 210, 211. Normally, this selector energizes the gate 210 to condition the gating circuit 208 for operation in response to inforcation pulses EV from lead 11. The information pulses are then temporarily stored on a first buffer register 213 which, in response to the next switching pulse D, transfers them by way of an OR matrix 220 to another buffer register 219 triggerable by the pulses D' to deliver these pulses to a set of power amplifiers 221 for selective energization thereof. The number of the amplifiers, here 24, equals the number of levels $a_1$, $a_2$ . . . $a_n$ in a ferrite-core memory 201, each level consisting of an orthogonal array of $q$ rows $r_1$–$r_q$ of $p$ storage elements of cores $e_1$–$e_p$. A cable 231 contains 24 writing wires for all the cores of each array, each of these wires being connected to the output of an individual amplifier 221 assigned to the respective array. In an analogous manner, 24 reading wires from the cores of the several arrays are combined in a cable 232 leading to a set of 24 power amplifiers 222 in the output of memory 201.

The succesive activation of all the cores of any row is accomplished by a set of address leads in a cable X extending from respective output lines of a pulse distributor 216 which in the present instance has 60 such lines jointly controlled by counters 214 and 215. Distributor 216 may comprise an AND matrix with six groups of 10 AND gates each, the gates of each group being collectively controlled by a respective stage lead from counter 215 whereas individual AND gates within each group have inputs connected to respective stage leads of counter 214. An output lead 233 of switching circuit 207, carrying the writing pulse W, is multiplied to all these AND gates so that pulse W appears, during each memory cycle TC, on only a single output of distributor 216. If, as assumed above, $p=64$, the last four cores in any row of each memory level will be idle. Each of the 60 output lines of distributor 216 is connected in parallel to the activating wires of corresponding cores of all 24 levels $a_1$–$a_n$.

The progressive shift of the activating signals from the first row $r_1$ of each memory level to successive lower rows takes place under the control of a cable Y containing as many address leads, up to 64 if $q=64$ as assumed above, as is necessary to accommodate all the active line segments of scanning area 32 (FIG. 2); the number of these segments equals $mk$ and, with $m=10$, will amount to either 2700 or 3500 if $k$ is chosen to equal 270 or 350 as mentioned above. Both these totals are well below the total storage capacity of $64 \times 64 = 4096$ cores. Thus, with each row of ferrite cores accommodating six scanning lines of 10 segments each, either 45 or 60 rows would be needed in each memory level.

Pulse distributor 218 is structurally similar to distributor 216 except that the AND gates selectively passing the writing pulse W to the 64 or less address wires of cable Y are individually controlled by respective stage leads from counter 217. Again, the address leads of cable Y are multiplied to corresponding rows of all memory levels $a_1$–$a_n$. It will be understood that, in accordance with conventional ferrite-core techniques, the address leads from cables X and Y may jointly supply the energy necessary to activate a particular core of each level, i.e., to sensitize this core so as to make it responsive to a writing current from one of the leads in cable 231. In an analogous manner, the cores are preselected under the control of distributors 216 and 218 to respond to a reading pulse R which, by way of an output lead 234 of switching circuit 207, is applied during each memory cycle to a particular combination of X and Y address leads whereby a previously stored pulse is released to a corresponding lead of cable 232 to energize one of the amplifiers of matrix 222, the core being simultaneously returned to its normal condition. This mode of information retrieval is commonly referred to as destructive readout. Conductors 233 and 234 are also connected to the amplifiers 221 and 222, respectively, to prevent any spurious energization thereof in the absence of a writing pulse W or reading pulse R.

For reasons which will become apparent hereinafter, the leads 233 and 234 are so connected to the distributors 216 and 218 that different outputs thereof are energized to carry the reading pulse and the writing pulse of a single cycle; for this purpose, suitable switchover means may be provided within the distributors or else the aforedescribed series of AND gates may be duplicated, each address wire or cable X or Y being connected through an OR junction to the output of two AND gates, one from each series.

Since the end-of-frame signal ST on conductor 230 resets all the counters including the "Y" counter 217, the supernumerary rows at the bottom of each array $a_1$–$a_n$ will remain unused even if address leads are connected to them. Thus, the number of lines per frame may be changed at will, within the limits of available storage capacity, without the need for additional connections.

Gating circuit 223 delivers the pulses read out from memory 201, now again in the form of a continuous train with a minimum recurrence period of 0.2 $\mu$s., to a video amplifier 224 having an output lead 21 which carries the beam-control signals SV to the input of the associated cathode-ray tube or tubes as illustrated in FIG. 1.

Another buffer register 225 is connected through a cable 235 to the outputs of amplifier matrix 222 to store the read-out pulses for a subsequent reinscription on the same ferrite cores by way of OR matrix 220, buffer register 219 and writing matrix 221. Buffer register 225 also has input connections from gating circuit 209 which, in an alternate position of mode selector 212, receives the signals EV from lead 11 via AND gate 211 and inverts them so as to obliterate corresponding portions of trace 26 (FIG. 1) by preventing the reinscription of previously read-out pulses on the memory 201. Buffer register 225 is periodically reset, concurrently with register 213, by the pulses D from counter 206. These pulses reach the register 225 through an OR gate 226 which can also be energized, at the will of the operator, from mode selector 212 to erase the entire trace if this energization lasts for at least the length of a scanning frame.

Figure 4:
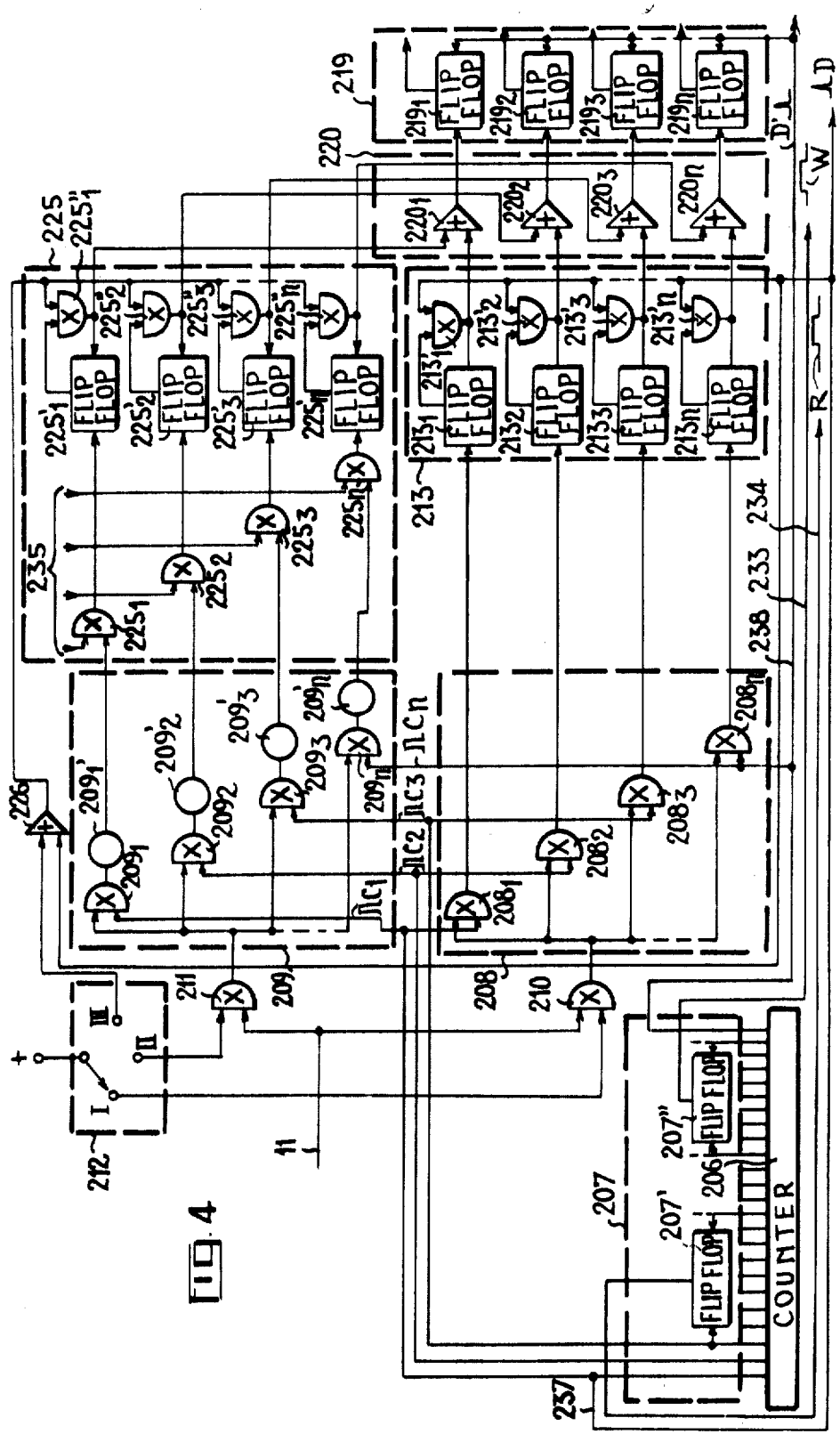
FIG. 4 is a more detailed circuit diagram of some of the units shown in FIG. 3.

The construction of units 207, 208, 209, 213, 219, 220 and 225 is shown in greater detail in FIG. 4. Switching circuit 207, traversed by the output leads from counter 206, includes a pair of flip-flops 207', 207" generating the pulses R and W on their respective output leads 234 and 233. Flip-flop 207' is set by the output pulse $C_3$ from the No. 3 stage of counter 206; it is reset by the pulse from No. 11 stage so that pulse R lasts for 1.6 $\mu$s., i.e., one-third of a memory cycle TC as illustrated in FIG. 6. Flip-flop 207" is set by a pulse from the No. 15 stage and reset by a pulse from the No. 23 stage of counter 206, thus lasting also from 1.6 $\mu$s. This duration, greatly exceeding the basic time period $1/F = 0.2$ $\mu$s. established by timing oscillator 202 (FIG. 3), indicated by the magnetization time of available ferrite cores and, in turn, requires the simultaneous storage of successive information pulses on a multiplicity of parallel memory levels as described above. Pulses D and D' are derived from code pulses $C_1$ and $C_n$ on the No. 1 and No. 24 output leads of counter 206; although the corresponding conductors 237 and 238 have been shown connected directly to the respective output leads, it will be understood that suitable pulse shapers (e.g., monostable multivibrators) may be used in their generation.

The various output leads of counter 206, carrying the code pulses $C_1$, $C_2$, $C_3$ . . . $C_n$, are connected in parallel to respective AND gates $208_1$, $208_2$, $208_3$ . . . $208_n$ and $209_1$, $209_2$, $209_3$ . . . $209_n$ of units 208 and 209, the gates of unit 208 also receiving the output from AND gate 210 in the illustrated normal position I of switch 212 whereas the gates of unit 209 are energizable via AND gate 211 in the alternate position II of that switch. Each AND gate $209_1$–$209_n$ is followed by a respective inverter $209_1'$, $209_2'$, $209_3'$ . . . $209_n'$ whose output is delivered to one of the inputs of a respective AND gate $225_1$, $225_2$, $225_3$ . . . $225_n$ having another input connected to a respective conductor in a cable 235 coming from the reading matrix 222 of FIG. 3. The AND gates of unit 208, when open, set respective flip-flops $213_1$, $213_2$, $213_3$ . . . $213_n$ of buffer register 213 whose outputs go to further AND gates $213_1'$, $213_2'$, $213_3'$ . . . $213_n'$, respectively; the latter gates are triggered by the switching pulse D from circuit 207 to transmit the output pulse to one of 24 OR gates $220_1$, $220_2$, $220_3$ . . . $220_n$ of circuit 220 if the corresponding flip-flops $213_1$ etc., had been set and, in such case, to reset the flip-flop; the OR gates of circuit 220 work into respective setting inputs of flip-flops $219_1$, $219_2$, $219_3$ . . . $219_n$ of buffer register 219 which are periodically reset by switching pulse D' and whose output signals are transmitted to respective amplifiers of matrix 221 (FIG. 3).

The gates $225_1$, $225_2$, $225_3$ ... $225_n$ of register 225, when open, set associated flip-flops $225_1'$, $225_2'$, $225_3'$ ... $225_n'$ to cooperate with respective AND gates $225_1''$, $225_2''$, $225_3''$ ... $225_n''$ in the same manner as do the elements of register 213; the outputs of AND gates $225_1''$, etc., are fed to the alternate inputs of OR gates $220_1$, etc., AND gates $225_1''$–$225_n''$ can also be energized, independently of switching pulse D, directly from a source of operating voltage (here positive) in a further position III of switch 212 by way of OR gate 226; in that case any flip-flop of register 225 set by a pulse from the preceding AND gate $225_1$, etc., is promptly reset and remains so until the position of switch 212 is changed.

Figure 5:
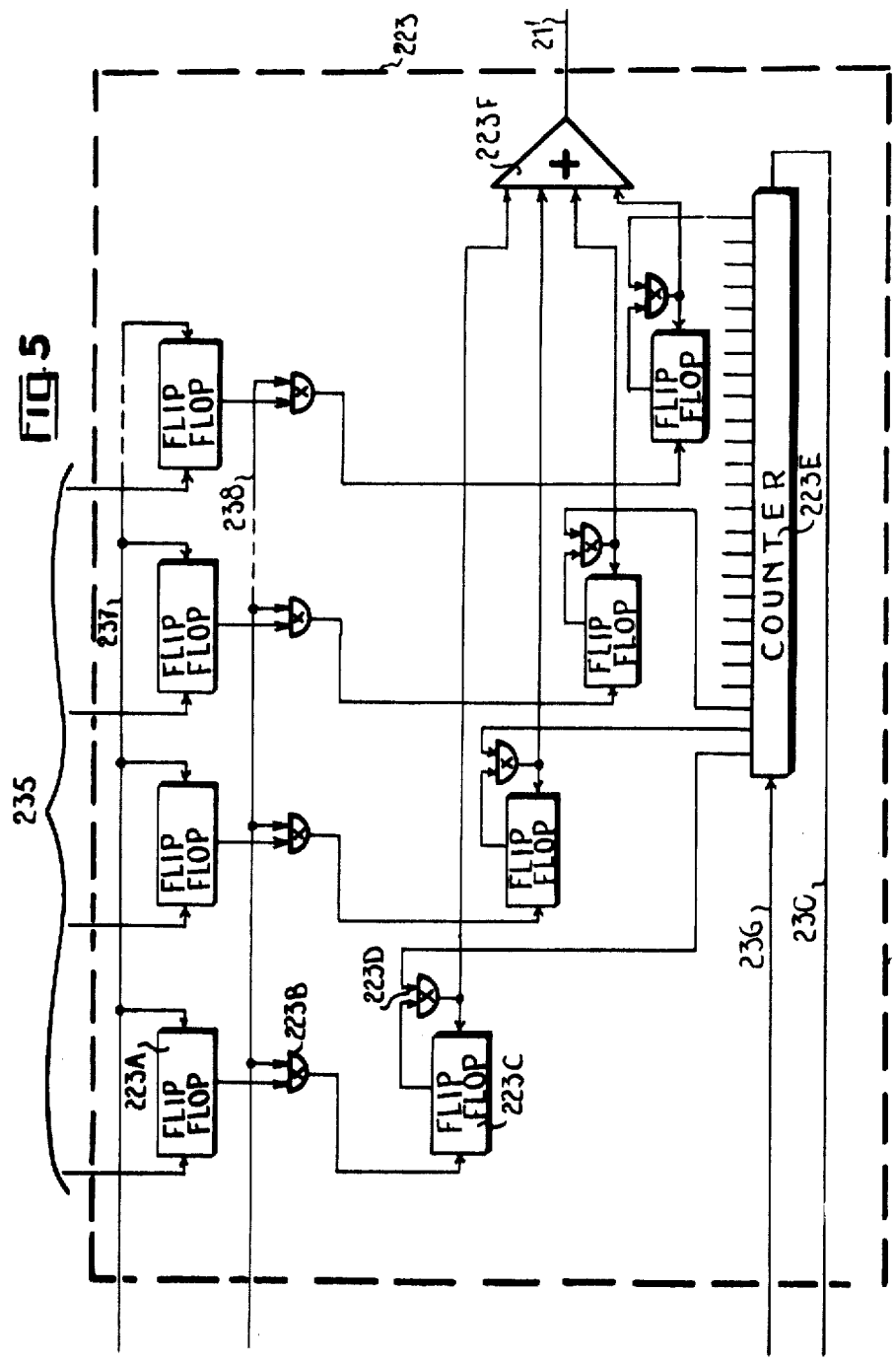
FIG. 5 is a circuit diagram of another unit of the system of FIG. 3.

FIG. 5 shows a typical circuit arrangement for the network 223 of FIG. 3. This unit is shown to comprise a set of 24 flip-flops, generally designated 223A, whose setting inputs are connected to respective wires from cable 235 and whose resetting inputs are connected in parallel to conductor 237 carrying the switching pulse D. The output signals of flip-flops 223A are applied to respective AND gates 223B having their second inputs connected in parallel to conductor 238 which carries the pulse D'. The output signals of AND gates 223B energize the setting inputs of respective flip-flops 223C associated with resetting AND gates 223D in the manner described for the elements of registers 213 and 225. AND gates 223D have their second inputs connected to respective outputs of a 24-stage counter 223E which is stepped by the output of AND gate 203 (FIG. 3) through lead 236 and also receives the zeroizing signal ST via lead 230. The output pulses of all AND gates 223D are delivered to conductor 21' through an OR gate 223F.

The operation of the system shown in FIGS. 1–5 will now be described in greater detail with reference to FIGS. 2 and 6. When the beam of cathode-ray tube 3 sweeps horizontally across area 32 along the first scanning line $L_1$, it impinges upon successive elemental parts $P_1$, $P_2$ ... $P_n$ of each segment $LS_1$, $LS_2$ ... $LS_m$ of that line, each elemental advance of the beam coinciding with the generation of a respective timing pulse A while each line segment is swept exactly in the course of a memory cycle TC of 4.8 μs. At the beginning of any line, signal B comes into existence; the time of occurrence of this signal, adjustable by means of control circuit 205 (FIG. 3), determines the position of scanning area 32 with reference to screen 31.

Let it be assumed that the luminous pencil 1 of FIG. 1 touches the screen 31 at the second elemental point $P_2$ of line segment $LS_2$ of the first scanning line $L_1$. This causes the generation of a code pulse $C_2$ in the second memory cycle TC of a 10-cycle interval of 48 μs. measured by the signal B. This code pulse is first stored on buffer register 213 where it remains for the balance of the memory cycle; since this storage time is variable and may be as short as 0.2 μs. (for the last code pulse $C_n$), pulse D causes the transfer of all the stored code pulses to buffer register 219 where they remain for a full memory cycle, i.e., the third cycle TC of this line scan. During this third cycle, in response to writing pulse W, an information pulse is inscribed on the second core $e_2$ of the first row $r_1$ of the second array $a_2$ of memory 201, thereby denoting the position of the luminous pencil on the second element of the second segment of the first line of area 31. Since this inscription takes place during the third memory cycle, the No. 3 output lead of counter 214 will be energized at this time together with the No. 1 output lead of counter 215; it will thus be apparent that distributors 216, 218 must be so wired as to select a core whose address is 1 less than the numerical reading of the counters.

In order that the operator may directly observe the trace produced by the movement of his pencil, the beam of the tube should be intensity-modulated (preferably suppressed or dimmed) in response to the output of the system as fed back to the input 33 (FIG. 1) of the cathode-ray tube 3. Since the information pulse thus generated by the luminous pencil has not yet been memorized and can therefore not be fed back, a corresponding pulse from an immediately preceding frame may be used in its stead inasmuch as the position of the pencil will change but little from one frame to the next. As the conversion from parallel storage to sequential transmission in network 223 consumes an entire memory cycle, the reading signal R for retrieving a pulse stored in the No. 2 core of row $r_1$ of any memory level must be generated during the first cycle TC of the line scan, i.e., while the beam sweeps the first segment $LS_1$ of line $L_1$; similarly, the visual registration of a trace on the first segment of any line must be initiated by a reading pulse geneartad during the last cycle TC of the preceding line scan. For this reason, control circuit 205 may be adjusted to emit the first line-start pulse SL before the beam sweep reaches the scanning area 32 and to delay the end-of-frame signal ST until after the beam has left the area.

It will thus be apparent that, insofar as the circuits controlled by conductor 234 (FIG. 3) are concerned, distributors 216 and 218 must be so wired as to select memory cores whose addresses exceed by 1 the actual reading of the counters; this involves an offset of two memory cycles as between the reading and writing circuits.

As long as a selector with 212 is in its position I, an information pulse fed back via cable 235 to one of the AND gates $225_1$–$225_n$ of register 225 (FIG. 4) is stored in that register for the remainder of the memory cycle and is discharged from the register 225 by the pulse D at the beginning of the next cycle so as to reach the register 219 concurrently with any new information pulse due to a light impulse picked up by the pencil on the same line segment during the current scanning frame. Thus, if the pencil 1 is held motionless during successive frames, the new pulse and the pulse from the preceding frame will energize the same OR gate in circuit 220. Buffer register 219 is cleared at the end of each memory cycle by pulse D' just before the occurrence of the next switching pulse D.

Figure 7:
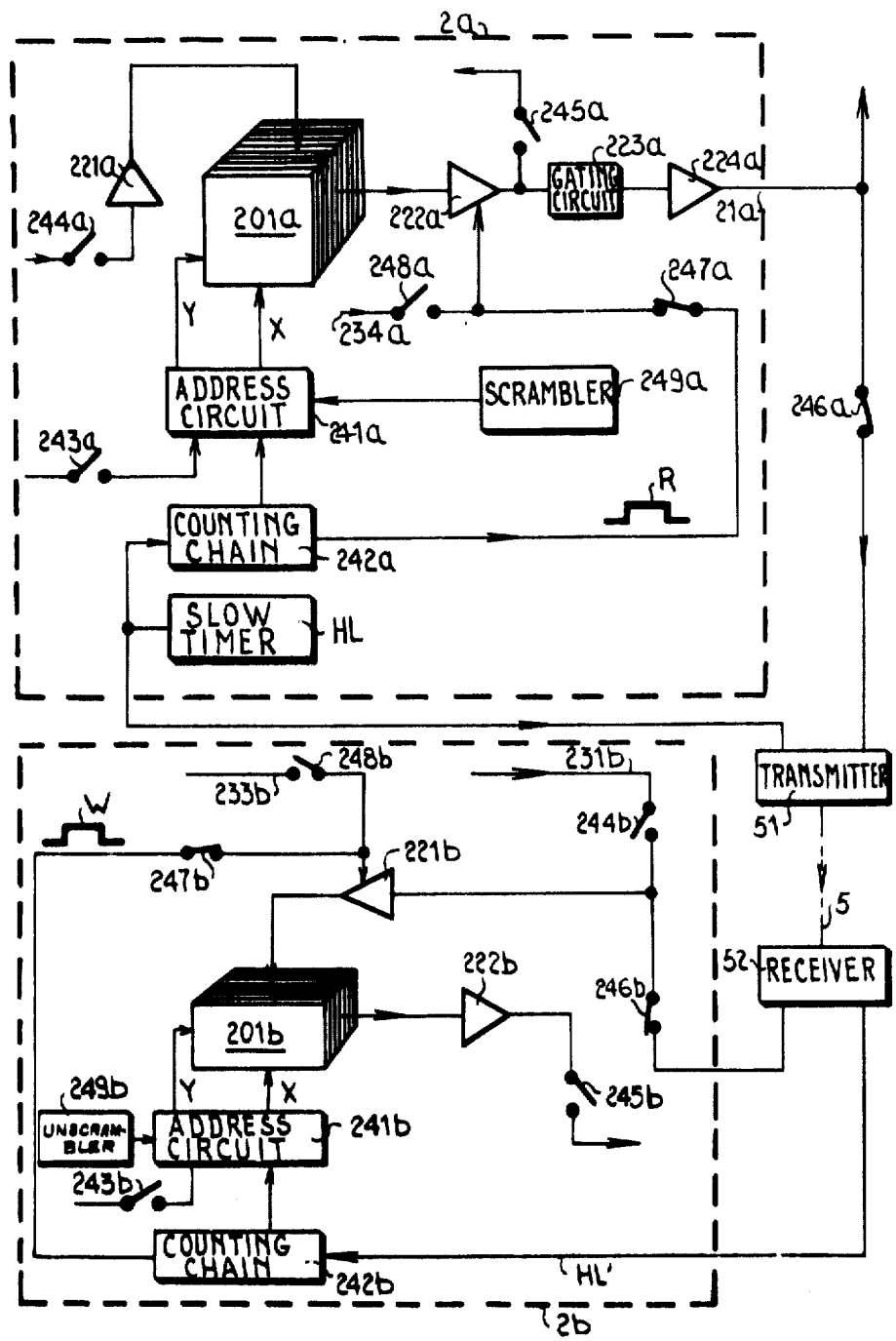
FIG. 7 is a block diagram similar to FIG. 3, showing a modification.

In FIG. 7 we have illustrated a system for transmitting, by cable or radio waves, the output of logic circuit 2 (FIG. 1) to a distant observer. This system includes a transmitting station 51 and a receiving station 52 interconnected by a channel 5 which, as noted earlier, is assumed to accommodate only a limited band of signal frequencies insufficient to transmit the train of pulses SV appearing on the lead 21 of FIG. 3. The elements of logic network 2a connected to transmitter 51 include a memory 201a, a set of writing amplifiers 221a, a set of reading amplifiers 222a, a gating circuit 223a and a video amplifier 224a, all similar to the analogously designated units of FIG. 3. An address circuit 241a, representing the distributors 216, 218 of FIG. 3, is controlled by a counting chain 242a similar to the counters 206, 214, 215 and 217, the chain 242a being stepped by a slow timer HL operation at a cadence considerably lower than that of timer 202 of FIG. 3, e.g., on the order of 1200 pulses per second. A switch 243a disconnects the address circuit 241a from the high-speed counting chain of FIG. 3 while another switch 244a prevents energization of the writing amplifiers 221a; the feedback from the outputs of reading amplifiers 222a is interrupted at a switch 245a. The reading pulse R is delivered to amplifiers 222a through a closed switch 247a while an open switch 248a prevents the feeding of this pulse to the amplifiers at its normal rate over conductor 234a. Output lead 21a of amplifier 224a delivers the lengthened signal pulses in the rhythm of timer HL via a closed switch 246a to transmitter 51. Receiver 52 conveys these signals through a closed switch 246b to a logic network 2b, specifically to the writing amplifiers 221b of a memory 201b similar to memory 201a at the transmitter. A lead HL' supplies low-frequency synchronizing signals of the cadence of the output of timer HL to counting a chain 242b which controls an address circuit 241b similar to circuit 241a, a high-speed input to circuit 241b being disconnected at a switch 243b. With the output leads of the receiving amplifiers 222b opened by a switch 245b, the arriving information pulses are stored on the memory 201b without being read out. Counting chain 242b delivers the writing pulse W by way of a closed switch 247b to amplifiers 221b whose normal input lead 233b is open at a switch 248b. Another switch 244b disconnects the amplifiers 221b from writing cable 231b.

After the received information has been fully recorded on memory 201b, switches 246b, 247b may be opened and switches 243b, 244b, 245b, 248b may be closed to permit the display of the memorized trace on an associated television receiver not shown, with continuous reinscription on the cores of memory 201b, in the manner described above with reference to the system of FIGS. 1–5.

If the information transmitted via channel 5 is to be held in secret, a scrambler 249a may be connected to address circuit 241a to alter its circuitry (i.e., to transpose the output leads of distributors 216 and 218. FIG. 3) so that the sequence of core selection will be changed. A complementary unscrambler 249b may similarly control the address circuit 241b to restore the original sequence at the receiving station. Units 249a, 249b may be manually adjustable or may be periodically changed by automatic means.

Figure 8:
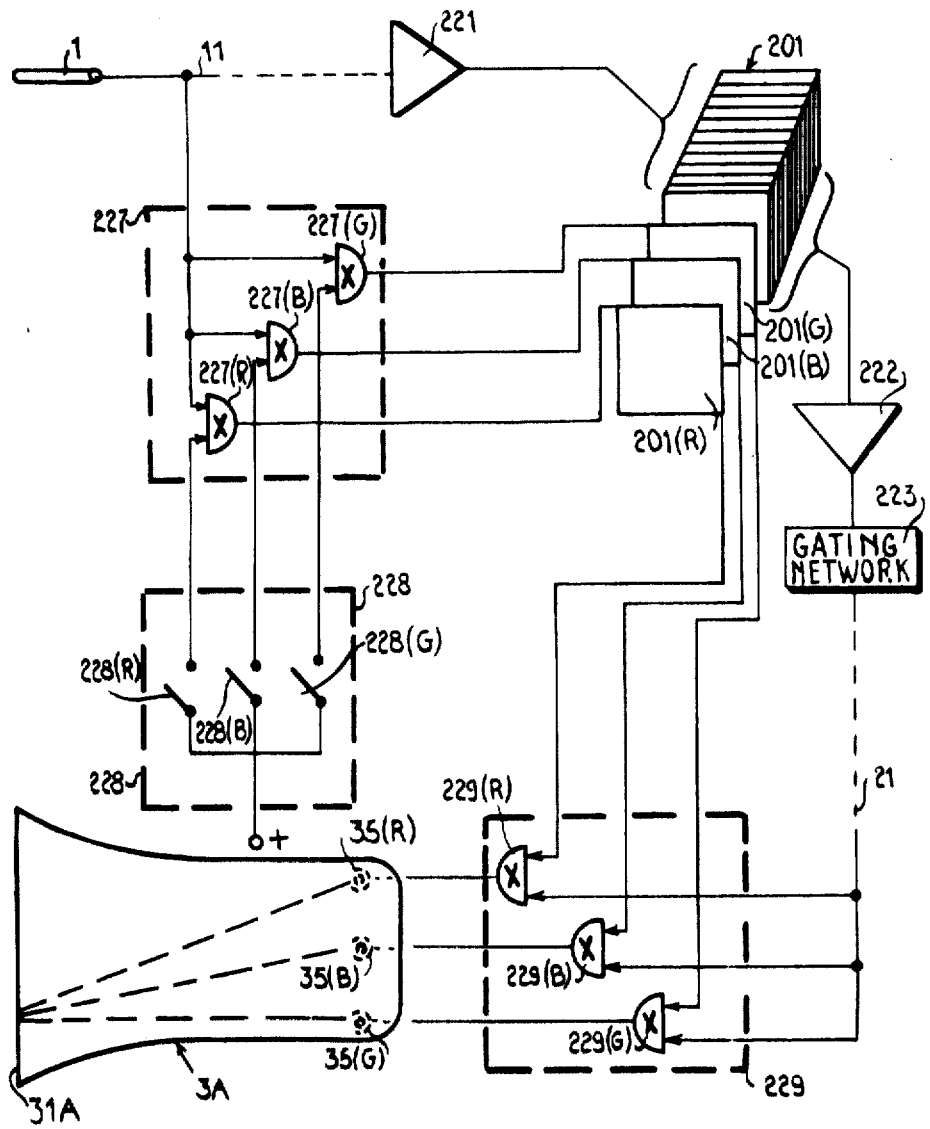
FIG. 8 is a block diagram of a further modification.

In FIG. 8 we have illustrated an extension of the arrangement of FIGS. 1–5 including means for selectively coloring a trace produced on the local and/or remote television screen or screens. Elements 201, 221, 222 and 223 have the same significance as in FIG. 3 the other units of the logic network being omitted. A color selector 228, in the form of a switch with sets of contacts 228(R), 228(B), 228(G) respectively representing the colors red, blue and green, controls a distributor 227 comprising three AND gates 227(R), 227(B) and 227(G). The output pulses of luminous pencil 1, delivered to the input lead 11 of the logic network shown in FIG. 3, are supplied in parallel therewith to the three AND gates of distributor 227 whose outputs are stored on the cores of three ancillary memory levels 201(R), 201(B) and 201(G) identical with the several memory levels $a_1$–$a_n$ shown in FIG. 3 and connected in parallel therewith to the address leads X and Y. Upon closure of switch contacts 228(R), for example, a color-identifying pulse is stored on a core of ancillary memory level 201(R) concurrently with the inscription of an information pulse on a corresponding core of one of the principal memory levels; closure of switch contacts 228(B) or 228(G) has the same effect in regard to ancillary level 201(B) or 201(G). Any two or, if desired, all three of these switch contacts could also be closed simultaneously; the number of possible simple or composite colors is thus seven.

The reading circuit of the system of FIG. 8 includes output leads from ancillary levels 201(R), 201(B), 201(G) connected to inputs of respective AND gates 229(R), 229(B), 229(G) of a distributor 229 which also receives the output pulses SV from conductor 21. The gates of distributor 229 selectively energize three electron guns 35(R), 35(B), 35(G) of a polychromatic cathode-ray tube 3A which may be the tube bearing the scanning surface 31 (FIGS. 1 and 2) or any tube connected in parallel therewith. The trace appearing on the screen 31A of tube 3A will thus have a distinct color as determined by the instantaneous setting of switch 228.

If, say, contacts 228(R) and 228(B) are closed simultaneously, an orange-colored trace will result. Should the operator thereafter open the contacts 228(R) and move the selector switch 212 of FIGS. 3 and 4 to its position II, he could change the color of the registering symbol or design to blue by retracing it with obliteration of its red component. It will be understood that the various registers of FIG. 3 will have to be expanded to include additional stages for accommodating the three types of color-indicating pulses.

We claim:
1. A system for the tracing of electronically reproducible symbols, comprising:
a point source of light provided with periodically operative sweep means for orthogonally displacing same in recurrent cycles across a predetermined area subdivided into a multiplicity of elemental parts;
a mobile photoelectric pickup device alignable with any elemental part of said area for receiving a luminous impulse once per cycle upon a sweep of said point source across such elemental part and translating said luminous impulse into an electric information pulse whose occurrence time within the cycle indicates the position of such elemental part;
memory means having a multiplicity of storage elements respectively assigned to said elemental parts;
address circuitry for said memory means including distributing means synchronized with said sweep means for successively activating storage elements assigned to elemental parts just scanned by said point source;
writing means controlled by the output of said pickup device for inscribing each information pulse upon a concurrently activated storage element; and
reading means coupled with said memory means for reproducing, from the information pulses inscribed on said storage elements, a trace made on said area with said pickup device.

2. A system as defined in claim 1 wherein said point source comprises an electron beam of cathode-ray tube having deflecting means for said beam controlled by said sweep means and further having an input for controlling the intensity of said beam and a luminous screen excitable by said beam, said area being part of the screen surface; said reading means including a feedback circuit to said input adapted to suppress said beam in response to a pulse read out from any of said storage elements whereby said trace is visibly registered on said screen.

3. A system as defined in claim 2 wherein said information pulses are destructively read out from said storage elements by said reading means, said feedback circuit being connected to said writing means for iteratively reinscribing a read-out pulse on the same storage element.

4. A system as defined in claim 3, further comprising optionally operable blanking means connected with said feedback means for temporarily suppressing the reinscription of read-out pulses upon said storage elements, thereby erasing a previously registered trace from said screen.

5. A system as defined in claim 3 wherein said pickup device is provided with an alternate output for invertedly controlling said writing means, said alternate output being selectively activable for partial erasure of a trace registered on said screen by a retracing of a portion thereof with said pickup device.

6. A system as defined in claim 3 wherein said reading means includes a receiving cathode-ray tube and transmission means for delivering pulses read out from said storage elements to said receiving cathode-ray tube to register a replica of said trace on the screen thereof.

7. A system as defined in claim 6 wherein said transmission means includes a channel with a frequency band incapable of transmitting read-out pulses at the rate of inscription thereof under the control of said sweep means; said reading means further including low-speed readout circuitry for said memory means at the entrance of said channel, second memory means at the exit of said channel, low-speed writing circuitry synchronized with said readout circuitry at the exit of said channel for inscribing pulses transmitted over said channel on said second memory means, and high-speed readout circuitry for feeding pulses stored on said second memory means to said receiving cathode-ray tube.

8. A system as defined in claim 7, further comprising scrambling means in said readout circuitry and complementary unscrambling means in said writing circuitry.

9. A system as defined in claim 3 wherein said memory means comprises n levels of storage elements, corresponding storage elements of all said levels being connected in parallel to said writing means and to said reading means; said writing means including first storage means for temporarily registering a succession of n information pulses and transfer means for simultaneously transmitting the pulses so registered to storage elements selected by said address means; said reading mean including second storage means having n stages connected to receive read-out pulses from respective levels of said memory means and sampling means for consecutively discharging said stages.

10. A system as defined in claim 9 wherein each of said levels consists of an array of storage elements forming a multiplicity of parallel rows; said address circuitry including a first branch for sequentially activating the elements of a row and a second branch for progressing from one row to the next, a source of timing pulses synchronized with said sweep means, said timing pulses having a period corresponding to the duration of the sweep of said beam across any elemental part of said area, first counter means for measuring a memory cycle of n timing pulses and stepping said first branch at the end of each memory cycle, and second counter means for measuring an interval equal to a predetermined plurality of memory cycles and stepping said second branch at the end of each of said interval.

11. A system as defined in claim 10 wherein the sweep of said beam across said area consists of a multiplicity of parallel lines each divided into m segments of n elemental parts each, said lines together forming part of a recurring frame, m being smaller than the number of storage elements in each row of any of said levels.

12. A system as defined in claim 11, further comprising a generator of reading and writing pulses controlled by said first counter means for alternately actuating said reading means and said writing means during each memory cycle.

13. A system as defined in claim 12 wherein said reading means is connected to said memory means in offset relationship with reference to said writing means for reading out pulses stored during an immediately preceding frame.

14. A system as defined in claim 1 wherein said reading means includes a cathode-ray tube with a plurality of beam sources for producing differently colored luminous spots on a receiving screen, further comprising color-selection means for individually controlling said beam sources in response of pulses read out from said memory means to produce on said receiving screen a selectively colored trace of the motion of said pickup device across said said.

15. A system as defined in claim 14 wherein said memory means comprises a multiplicity of principal memory levels with corresponding storage elements connected in parallel to said writing means and to said reading means; said color-selection means including a plurality of ancillary memory levels each having the same number of storage elements as said principal levels, each of said ancillary levels being connected to receive a distinct color signal for storage on certain of its elements concurrently with inscription of corresponding information pulses on corresponding storage elements of said principal levels.

References Cited
UNITED STATES PATENTS

| | | | |
|---|---|---|---|
| 3,241,120 | 3/1966 | Amdahl | 340—172.5 |
| 3,346,853 | 10/1967 | Koster et al. | 340—172.5 |
| 3,351,929 | 11/1967 | Wagner | 340—324.1 |
| 3,394,366 | 7/1968 | Dye | 340—324.1 |

PAUL J. HENON, Primary Examiner

S. R. CHIRLIN, Assistant Examiner

U.S. Cl. X.R.

340—324